(12) United States Patent
Krumbacher

(10) Patent No.: US 9,102,065 B2
(45) Date of Patent: Aug. 11, 2015

(54) INDUSTRIAL ROBOT WITH ACTUATORS EXTENDING IN A PRIMARY HAND ENCLOSURE

(71) Applicant: Rainer Krumbacher, Rettenbach (DE)

(72) Inventor: Rainer Krumbacher, Rettenbach (DE)

(73) Assignee: Kuka Roboter GmbH, Augsburg (DE)

( * ) Notice: Subject to any disclaimer, the term of this patent is extended or adjusted under 35 U.S.C. 154(b) by 70 days.

(21) Appl. No.: 13/898,790

(22) Filed: May 21, 2013

(65) Prior Publication Data

US 2013/0305869 A1 Nov. 21, 2013

(30) Foreign Application Priority Data

May 21, 2012 (DE) .......................... 10 2012 208 448

(51) Int. Cl.
*B25J 17/02* (2006.01)
*B25J 15/02* (2006.01)

(52) U.S. Cl.
CPC .............. *B25J 17/02* (2013.01); *B25J 17/0283* (2013.01); *B25J 15/0286* (2013.01); *Y10S 901/29* (2013.01); *Y10T 74/20335* (2015.01)

(58) Field of Classification Search
USPC ............... 74/490.01, 490.03, 490.05, 490.06; 901/28, 29
See application file for complete search history.

(56) References Cited

U.S. PATENT DOCUMENTS

| | | | | |
|---|---|---|---|---|
| 4,804,304 A | * | 2/1989 | Tellden .......................... 414/735 |
| 4,922,755 A | * | 5/1990 | Oshiro et al. .............. 74/490.03 |
| 5,350,263 A | * | 9/1994 | Fedeli ............................. 409/231 |
| 7,806,020 B2 | * | 10/2010 | Forslund et al. ........... 74/490.06 |
| 7,836,789 B2 | * | 11/2010 | Haniya et al. .............. 74/490.06 |
| 2008/0016979 A1 | * | 1/2008 | Yasumura et al. ......... 74/490.03 |
| 2008/0034920 A1 | * | 2/2008 | Inoue et al. ................ 74/665 M |
| 2009/0032649 A1 | | 2/2009 | Inoue et al. |
| 2009/0173177 A1 | * | 7/2009 | Sugawara et al. .......... 74/490.03 |
| 2009/0258770 A1 | * | 10/2009 | Jajtic et al. ....................... 483/69 |
| 2010/0213776 A1 | * | 8/2010 | Muller et al. ................... 310/83 |
| 2011/0154935 A1 | * | 6/2011 | Liu .............................. 74/490.04 |
| 2011/0252921 A1 | * | 10/2011 | Nakagiri et al. ............ 74/665 R |
| 2012/0067148 A1 | | 3/2012 | Long |
| 2012/0103127 A1 | | 5/2012 | Liu |
| 2013/0305869 A1 | * | 11/2013 | Krumbacher .............. 74/490.06 |

FOREIGN PATENT DOCUMENTS

| | | |
|---|---|---|
| DE | 102007009850 A1 | 9/2008 |
| EP | 0130539 A2 | 1/1985 |
| JP | 4-141390 | 5/1992 |

* cited by examiner

*Primary Examiner* — William Kelleher
*Assistant Examiner* — Thomas Magnuson
(74) *Attorney, Agent, or Firm* — Schiff Hardin LLP

(57) ABSTRACT

An industrial robot has a robot arm with a linkage and an arm extension that is pivotable at the linkage. The arm extension has an arm enclosure that is pivotable at the linkage. The arm extension has a primary hand enclosure that can rotate, means of a first actuator that has a first drive shaft, at the arm enclosure around an arm axle extending in the longitudinal dimension of the arm extension. The arm extension has a first hand element that is adjustable around a first hand axle relative to the primary hand enclosure by means of a second actuator that has a second drive shaft, and a second hand element that is adjustable around a second hand axle relative to the first-hand element by means of a third actuator that has a third drive shaft. The first, second and third actuators are arranged in the primary hand enclosure with their respective drive shafts extending essentially parallel to and at a distance from the arm axle.

12 Claims, 4 Drawing Sheets

INDUSTRIAL ROBOT WITH ACTUATORS EXTENDING IN A PRIMARY HAND ENCLOSURE

BACKGROUND OF THE INVENTION

1. Field of the invention

The invention concerns an industrial robot of the type having a robot arm with a linkage and an arm extension that is mounted and supported such that it can pivot on the linkage, and the arm extension having an arm enclosure borne such that it can pivot on the linkage, and the arm enclosure having a primary hand housing mounted such that it can rotate at the arm enclosure, by means of a first actuator that has a first drive shaft, on an arm axle extending along the longitudinal extent of the arm extension; and which has a first-hand element that can be adjusted around a firsthand axle relative to the primary hand housing by means of a second actuator that has a second drive shaft; and a second-hand element adjustable around a second-hand axle relative to the first hand element by means of a third actuator that has a third drive shaft.

2. Description of the Prior Art

US 2012/0103127 A1 discloses a robot arm with a hollow hand articulation enclosure; a hand articulation that is borne such that it can rotate at the hand articulation enclosure; a first actuator; a first transmission mechanism; a rotation element; a second actuator; and a second transmission mechanism. The first actuator is arranged in the hand articulation enclosure with its drive shaft aligned transversal to the longitudinal dimension of the arm extension in order to drive the hand articulation such that it can rotate around a first rotation axle relative the hand articulation enclosure. The first transmission mechanism is likewise arranged in the hand articulation enclosure and is positioned between the hand articulation and the first actuator. The rotation element is borne such that it can rotate along a second rotation axis at a distal end of the hand articulation. The second actuator is arranged in the hand articulation enclosure with its drive shaft aligned transversal to the longitudinal dimension of the arm extension in order to drive the rotation element around a second rotation axle. The second transmission mechanism is arranged in the hand articulation enclosure and between the second actuator and the rotation element.

SUMMARY OF THE INVENTION

An object of the invention is to provide an improved industrial robot. In particular, it is an object of the invention to provide an industrial robot with an improved routing of supply lines through an arm extension of said industrial robot and/or to achieve an arm extension that is compact in terms of its structural size.

The above object is achieved in accordance with the invention by an industrial robot having a robot arm that has a linkage and an arm extension borne so as to be pivotable at said linkage, the arm extension having an arm enclosure mounted so as to be pivotable at the linkage, and the arm extension having a primary hand enclosure mounted such that it can rotate, by means of a first actuator that has a first drive shaft, at the arm enclosure around an arm axle extending in the longitudinal dimension of the arm extension. The arm extension has a first hand element adjustable around a first hand axle relative to the primary hand enclosure by means of a second actuator that has a second drive shaft, and a second hand element adjustable around a second hand axle relative to the first-hand element by means of a third actuator that has a third drive shaft. The first actuator, the second actuator and the third actuator are arranged in the primary hand enclosure with their respective drive shafts extending at least essentially parallel to and at a distance from the arm axle.

Industrial robots are work machines that can be equipped for automatic handling and/or processing of objects with tools and are programmable in multiple movement axes, for example with regard to orientation, position and workflow. Robots typically have a robot arm with multiple elements connected via articulations and programmable controllers (control devices) that control or regulate the movement workflows during the operation. The elements are moved—in particular with regard to the movement axes—via actuators (in particular electric actuators) that are controlled by a control device.

An exemplary embodiment of an industrial robot can be a six-axis articulated arm robot. Such an industrial robot can have a base frame on which a carousel is borne such that it can rotate. A linkage can be mounted on the carousel such that said linkage can pivot. The linkage can in particular be mounted on a carousel pivotable around a vertical axle such that said linkage can pivot on a horizontal axle. An arm extension is borne on the linkage such that said arm extension is pivotable or rotatable. The base frame, the carousel, the linkage and the arm extension consequently form four elements of the industrial robot that are connected with one another so as to be movable via three articulations. Each of the three articulations can be moved automatically by means of a separate actuator that in particular can comprise an electric motor.

The arm extension itself can have three additional articulations. As described according to the invention, the arm extension can have an arm enclosure borne so as to be pivotable at the linkage. A primary hand enclosure can be borne at the arm enclosure so as to be rotatable by means of a first actuator around an arm axle extending in the longitudinal dimension of the arm extension.

A fourth articulation of the industrial robot can thus be formed between arm enclosure and primary hand enclosure. This fourth articulation can be moved automatically by means of the first actuator according to the invention. The first actuator has a first drive shaft. A drive shaft—in particular a motor shaft of the actuator—can rotate around this first drive shaft. A first hand element is in turn borne so as to be pivotable at the primary hand enclosure. A fifth articulation of the industrial robot can thus be formed between the primary hand enclosure and the first-hand element. This fifth articulation can be moved automatically by means of the second actuator according to the invention. The second actuator has a second drive shaft. The first hand axle can be adjusted relative to the primary hand enclosure by means of the second actuator. A second hand element is borne so as to be movable at the first-hand element. In particular, the second hand element can be a robot flange borne so as to be rotatable at the first hand element. A tool to be moved and/or to be operated by the industrial robot can be attached to the robot flange. A sixth articulation of the industrial robot can thus be formed between the first-hand element and second-hand element. This sixth articulation can be moved automatically by means of the third actuator according to the invention. The third actuator has a third drive shaft. The second hand element can be adjusted relative to the first-hand element by means of the third actuator.

In that both the first actuator and the second and third actuator are arranged with their respective drive shafts arranged in the primary hand enclosure so as to be essentially parallel to and at a distance from the arm axle, in spite of a compact structural size of the arm extension a free structural space—in particular a free structural space extending along the arm extension—can be achieved between the three actuators along the arm axle in order to be able to route a supply line therein, for example. Such a free routing of a supply line can thereby increase the free length of the supply line relative to known technical solutions, such that a torsion of the supply line within the arm extension that occurs due to movements of the industrial robot can distribute over an optimally large length, whereby the torsion forces or torsion stresses on the supply line can be reduced. The service life of the supply line (and consequently the operating life of the industrial robot) thus can be extended.

If the actuators are arranged in the primary hand enclosure such that their respective drive shafts extend essentially in parallel with and at a distance from the arm axle. This can mean that the drive shafts are aligned exactly parallel to the arm axle or the longitudinal dimension of the arm extension. However, it can also mean that the actuators with their drive shafts can be arranged in the primary hand enclosure such that they deviate slightly from a parallel alignment insofar as that, due to a sufficient clearance of the actuators from the arm axle, or from one another, a supply line can continue to be directed through a free structural space between the three actuators without significant bending or significant buckling.

In an embodiment according to the invention, the arm enclosure can be connected so as to be rotatable with the primary hand enclosure via a quill drive mechanism that has a hollow shaft through which at least one supply line (in particular having at least one electric, pneumatic and/or hydraulic line) is directed that extends at least essentially along the arm axle into the primary hand enclosure, wherein the first actuator, the second actuator and the third actuator are arranged at a radial distance from the arm axle, and externally enclosing the at least one supply line in the primary hand enclosure.

As in other embodiments according to the invention, the arm enclosure can also thereby form an element of the industrial robot that is arranged between the linkage and the primary hand enclosure, in particular an element arranged between the third and fourth articulation. As in other embodiments according to the invention, the primary hand enclosure can also thereby form an element of the industrial robot that is arranged between the arm enclosure and a pivotable hand of the industrial robot, in particular an element arranged between the fourth and fifth articulation. The industrial robot can be a six-axis articulated arm robot.

The hollow shaft has an open inner diameter that is so large that the supply line can be loosely directed through it. Inasmuch, the first actuator, the second actuator and the third actuator can be arranged in a primary hand enclosure at such a radial distance from the arm axle that the actuators (in particular the motor housing of the actuators) do not overlap or, respectively, cut across the open inner diameter, i.e. the usable clearance of the hollow shaft in a projected view.

As in other embodiments according to the invention, that axle around which the primary hand enclosure rotates relative to the arm enclosure can thereby also be understood as an arm axle.

In an embodiment of the invention, a protective conduit having a casing wall can be arranged within the primary hand enclosure, which protective conduit encloses the at least one supply line (in particular the at least one electric, pneumatic and/or hydraulic line) in the longitudinal direction, around whose casing wall are arranged the first actuator, second actuator and third actuator.

Expressed differently: the protective conduit can thus be arranged aligned coaxially with the arm axle in the primary hand enclosure. The protective conduit can be attached to the arm enclosure. Alternatively, the protective conduit can be attached to the primary hand enclosure. The protective conduit can also be attached to an output element or an actuator element of a quill drive mechanism connecting the primary hand enclosure with the arm enclosure so as to allow rotation. The protective conduit can align with the hollow shaft of the quill drive mechanism.

In all embodiments according to the invention, the first actuator, the second actuator and the third actuator are arranged distributed around the arm enclosure in the primary hand enclosure with their respective drive shafts offset by a respective 90 degree angle. Expressed in a different way: the drive shafts of two of the three actuators can lie in the same plane, and the drive shaft of the third actuator can lie in a common plane with the drive shaft of one of the two other actuators. The three drive shafts can thus lie in two planes situated orthogonal to one another that do not intersect with the arm axle.

In all embodiments according to the invention, the first actuator, the second actuator and the third actuator respectively have a motor housing that has an enclosure casing wall in the shape of a circular arc, at least at a sector of the motor housing facing towards the arm axle (in particular a sector of the motor housing facing toward the arm axle and extending at least over a 90 degree angle).

In general, the motor housing can thus entirely have an enclosure casing wall that has the shape of a circular cylinder in cross section. In this varied embodiment, however, the actuators can respectively have a motor housing that has an enclosure casing wall that has the shape of a circular arc in cross section only or at least in a sector facing towards the arm axle, and moreover have flat enclosure walls situated orthogonal to one another, for example, thus form vertices (in particular right-angle vertices).

In a special embodiment, the actuators in a sector of the motor housing that faces towards the arm axle and in a sector of the motor housing that faces away from the arm axle have an enclosure casing wall that is shaped like a circular arc in cross section, and moreover have flat enclosure walls situated orthogonal to one another, for example, thus form vertices (in particular right-angle vertices).

The first actuator, the second actuator and the third actuator can each have a motor housing that has an enclosure wall of constant thickness, at least in a sector of the motor housing facing towards the arm axle, in particular a sector of the motor housing facing wards the arm axle and extending at least over a 90 degree angle.

Alternatively or additionally, the first actuator, the second actuator and the third actuator respectively have an output-side flange, a flange at the rotary encoder side that is axially opposite the output-side flange, and a middle enclosure segment that is arranged between the two flanges, which middle enclosure segment is formed in the shape of a tube with an annular wall thickness that is constant in cross section.

In all embodiments according to the invention, the second actuator and/or the third actuator have a respective angular gear—in particular an angular gear deflecting the turning moment by a 90 degree angle—at their output-side flanges.

With the installation of angular gears, for example, drive belt pulleys that are connected with the first hand element and/or the second hand element can be reused in a similar design as this has already previously been the case in the actuators known to the man skilled in the art, installed with their motor shafts transversal (i.e. orthogonal) to the arm axle.

In an embodiment, the angular gear or the angular gears have a respective drive belt pulley at the output side which transmits the turning moment via a drive belt (running on said drive belt pulley) to a drive belt pulley connected with the first-hand element and/or the second-hand element, in particular via an interposed gearing.

In all embodiments according to the invention, the first actuator can have a driving pinion (input gear) that, to form a cylindrical gear stage, meshes with an output cylindrical gear that is connected with the arm enclosure and/or is connected with an actuator-side input shaft of a quill drive mechanism connecting the arm enclosure with the primary hand enclosure so as to allow rotation.

The first actuator thus can be pushed out of the center of the primary hand enclosure so that structural space is obtained in order to be able to route a supply line therein, for example.

DESCRIPTION OF THE PREFERRED EMBODIMENTS

Figure 1:
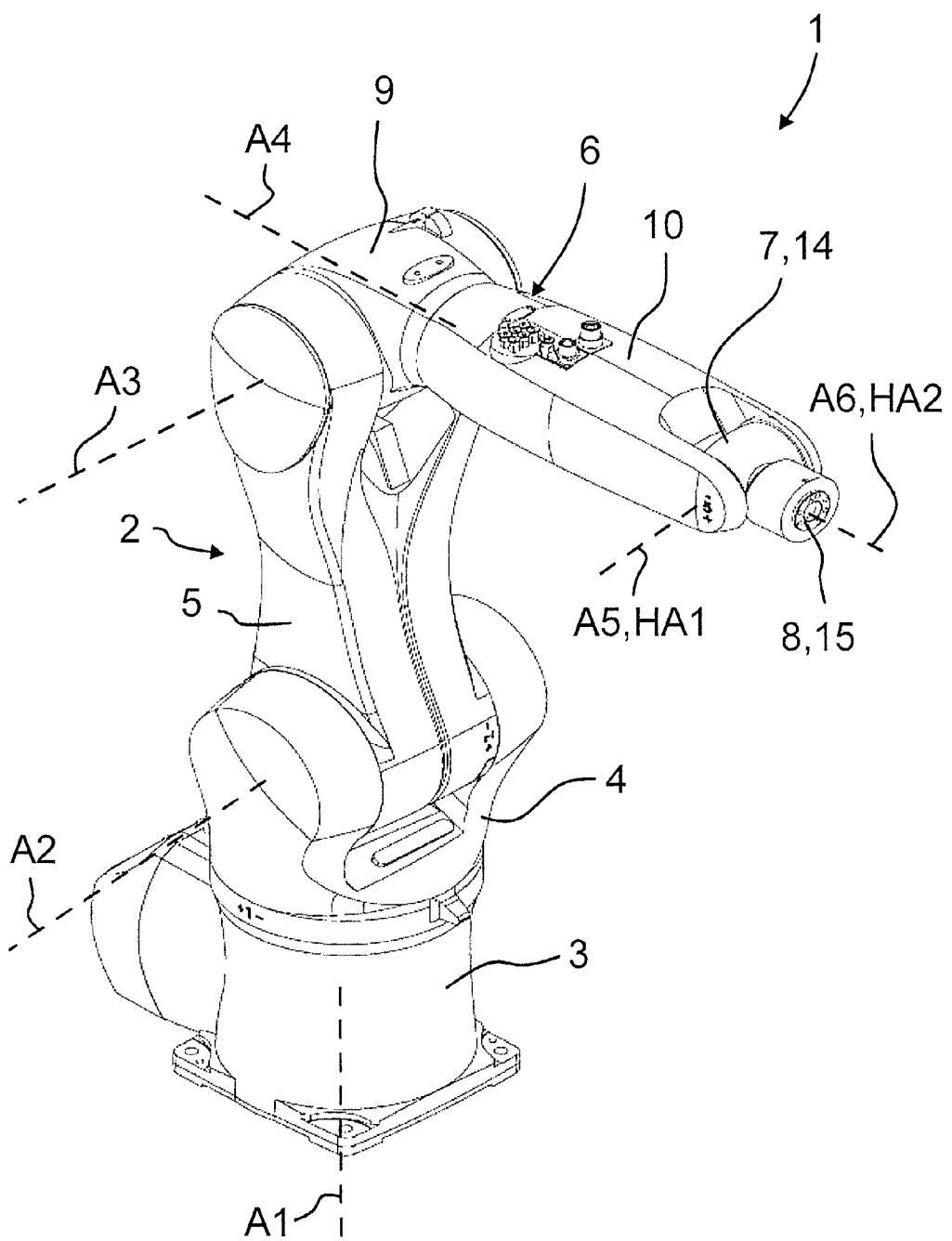
FIG. 1 is a perspective view of an industrial robot with an arm extension according to the invention.

FIG. 1 shows an industrial robot 1 that has a robot arm 2. In the case of the present exemplary embodiment, the robot arm 2 comprises multiple elements arranged in series and connected by means of articulations. The elements are in particular a frame 3 and a carousel 4 borne such that it can rotate relative to the frame 3 around a vertically traveling axle A1. In the case of the present exemplary embodiment, additional elements of the robot arm 2 are a linkage 5, an arm extension 6 and an (advantageously multi-axle) robot hand 7 with an attachment device executed as a flange 8 for the attachment of an end effector (not shown in detail). The oscillator 5 is mounted/surrounded at the lower end—for example on a linkage bearing head (not shown in detail) on the carousel 4—so as to be pivotable around an advantageously horizontal rotation axis A2. The arm extension 6 is in turn mounted/surrounded at the upper end of the linkage 5 so as to be pivotable around a—likewise advantageously horizontal—axle A3 of the arm extension 6. On one side this supports the robot hand 7 with its (advantageously three) rotation axles A4, A5, A6.

In the shown exemplary embodiment, the arm extension 6 has an arm enclosure 9 that is borne so as to be pivotable at the linkage 5. A primary hand enclosure 10 of the arm extension 6 is mounted at the arm enclosure 9 so as to be pivotable around the axle A4.

Figure 2:
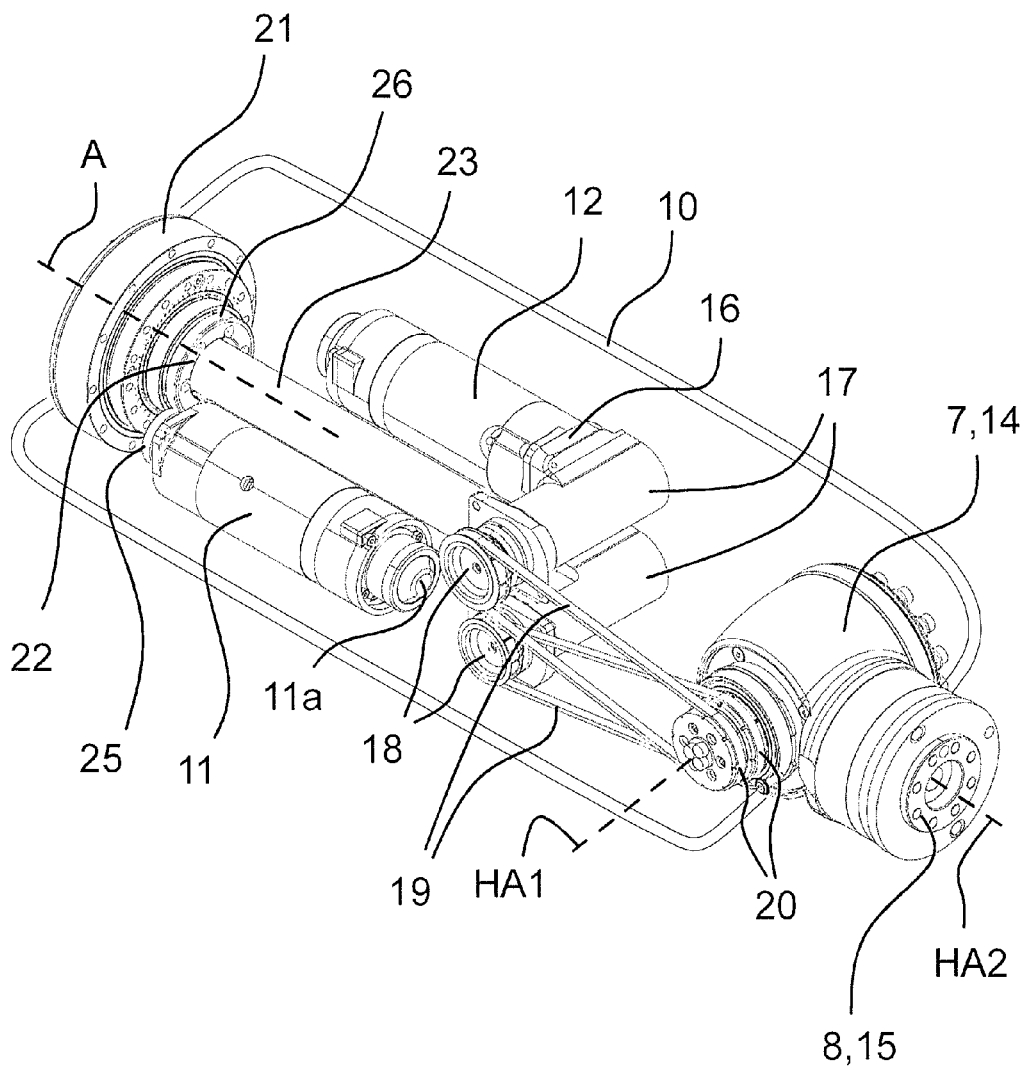
FIG. 2 is a perspective view of the arm extension according to the invention in isolation, with an arrangement of components of the arm extension.

The arm extension 6 is shown in detail in isolation and with graphically separated primary hand enclosure 10 in FIG. 2.

In the present exemplary embodiment, the primary hand enclosure 10 is supported on the arm enclosure 9 by a first actuator 11 (which has a first drive shaft 11a) such that said primary hand enclosure 10 is rotatable around an arm axle A extending in the longitudinal dimension of the arm extension 6.

Figure 3:
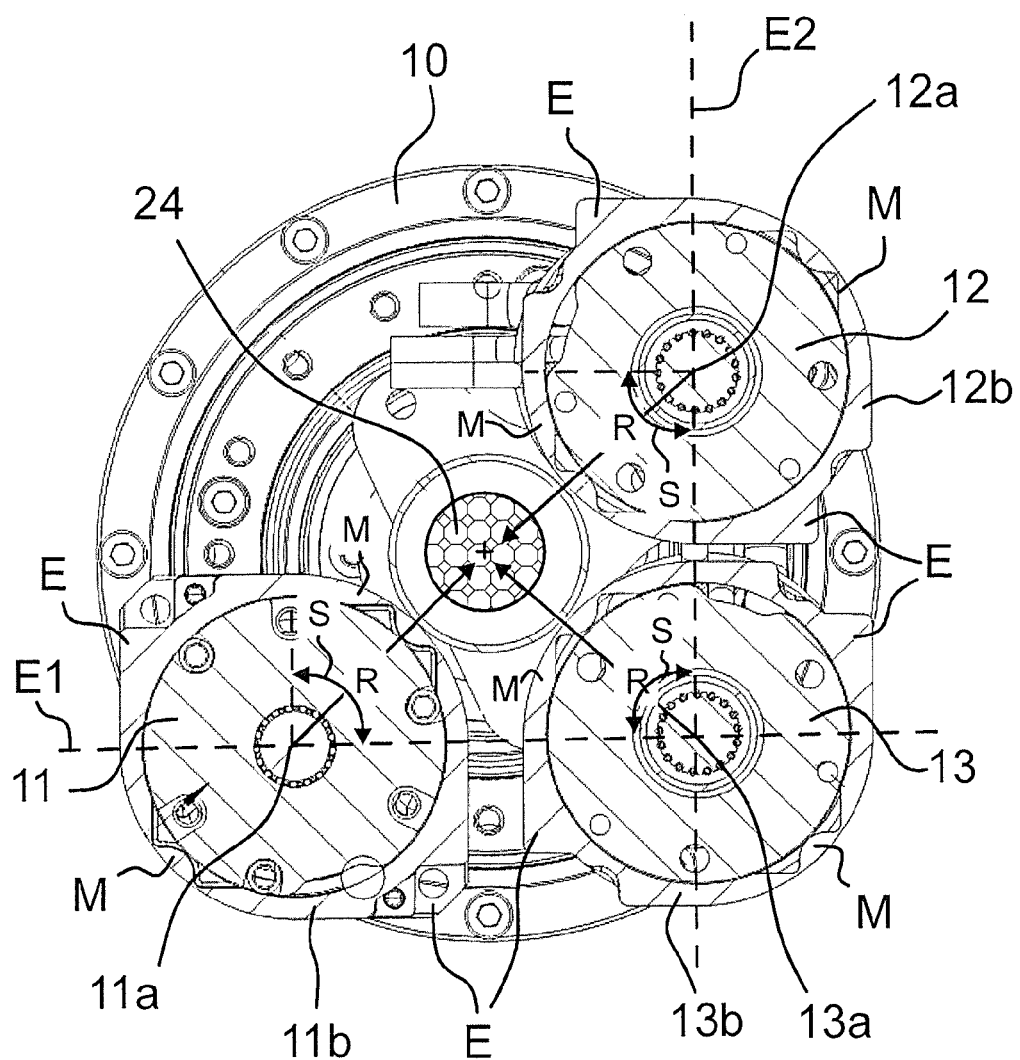
FIG. 3 is a cross-section representation through the arm extension according to FIG. 2.

A first hand element 14 is borne so as to be adjustable (in the present exemplary embodiment pivotable) relative to the primary hand enclosure 10 around a first hand first hand axle HA1 by means of a second actuator 12 that has a second drive shaft 12a (FIG. 3).

A second hand element 15 is borne so as to be adjustable (in the present exemplary embodiment rotatable) relative to the first hand element 14 around a second hand axle HA2 by means of a third actuator 13 that has a third drive shaft 13a (FIG. 3).

In the shown exemplary embodiment, the second actuator 12 and the third actuator 13 have at their output-side flanges 16 a respective angular gear 17, in particular an angular gear 17 deflecting the turning moment by an angle of 90 degrees. The turning moments acting around the longitudinal dimension of the primary hand enclosure 10 are deflected by 90 degrees on a respective drive belt pulley 18 via the angular gear 17. A drive belt 19 runs at each drive belt pulley 18. Each drive belt pulley 18 is connected with a drive belt pulley 20 via the drive belts 19. Respective drive belt pulleys 20 are connected with the first-hand element 14 and the second-hand element 15.

Each angular gear 17 thus has a respective drive belt pulley 18 which transfers the turning moment via a drive belt 19 running on the drive belt pulley 18 to a drive belt pulley 20 connected with the first hand element 14 and/or the second hand element 15, in particular connected via an interposed gearing.

In the embodiment shown in detail in FIG. 2, the arm enclosure 9 is connected via a quill drive mechanism 21 with the primary hand enclosure 10 so as to be rotatable. The quill drive mechanism 21 has a hollow shaft 22 through which at least one supply line (not shown in detail) is routed.

Spatially, the supply line runs within a protective conduit 23. The protective conduit 23 is arranged in the primary hand enclosure 10. According to the invention, the first actuator 11, the second actuator 12 and the third actuator 12 are arranged around the protective conduit 23.

Expressed in a different way: the protective conduit 23 can thus be arranged aligned coaxial to the arm axle A in the primary hand enclosure 10. The protective conduit 23 can be attached to the quill drive mechanism 21 as shown. The protective conduit 23 aligns with the hollow shaft 22 of the quill drive mechanism 21, as shown in FIG. 3.

As shown in FIG. 2, the first actuator 11 has a driving pinion 25 that meshes with an output cylindrical gear 26 to form a cylindrical gearing stage. The output cylindrical gear 26 is connected with a drive-side input shaft or, respectively, the hollow shaft 22 of the quill drive mechanism 21 connecting the arm enclosure 9 with the primary hand enclosure 10 so as to allow rotation. The first actuator 11 can thereby be pushed out of the center of the primary hand enclosure 10 so that structural space is obtained in order to be able to route a supply line 24 therein.

As is clarified in a cross section view in FIG. 3, in the shown embodiment the first actuator 11, the second actuator 12 and the third actuator 13 extend at least essentially along the arm axle A (orthogonal to the plane of the cross section of FIG. 3) in the primary hand enclosure 10, wherein the first actuator 11, the second actuator 12 and the third actuator 13 are arranged at a radial distance R from the arm axle, outwardly surrounding the at least one supply line 24 in the primary hand enclosure 10.

The hollow shaft 22 has an open internal diameter that is at least so large that the supply line 24 can be loosely directed through it as shown in FIG. 3. Inasmuch, in the embodiment shown in FIG. 3 the first actuator 11, the second actuator 12 and the third actuator 13 are arranged at such a radial distance R from the arm axle A in the primary hand enclosure 10 that—in a longitudinal view, thus in plan view of the cross section plane of FIG. 3—the actuators 11, 12, 13 in particular do not cross over or cut through the open inner diameter (i.e. the usable clearance) of the hollow shaft 22 in a projected view, as this is visible in FIG. 3.

Both the first actuator 11 and the second and third actuator 12, 13 are arranged in the primary hand enclosure 10 with their respective drive shafts 11a, 12a, 13a extending at least essentially parallel to and at a distance R from the arm axle A.

In that both the first actuator 11 and the second and third actuator 12, 13 are arranged in the primary hand enclosure 10 with their respective drive shafts 11a, 12a, 13a extending at least essentially parallel to and at a distance R from the arm axle A, in spite of a compact structural size of the arm extension 6 a free structural space—that in particular extends along the arm extension (FIG. 2)—can be achieved between the three actuators 11, 12, 13 along the arm axle in order to be able to route the supply line 24 therein. As shown in FIG. 2, the protective conduit 23 in which the supply line 24 is routed can also be arranged in the structural space that is thus achieved.

The supply line 24 (FIG. 3) thereby runs to the side of all three actuators 11, 12, 13 in the longitudinal alignment of the drive shafts 11a, 12a, 13a of the actuators 11, 12, 13, and essentially parallel to these actuators 11, 12, 13 through the primary hand enclosure 10. As in all embodiments according to the invention, that axle around which the primary hand enclosure 10 rotates relative to the arm enclosure 9 can thereby be understood as an arm axle A.

As is shown in the cross section view in FIG. 3, the first actuator 11, the second actuator 12 and the third actuator 13 are arranged in the primary hand enclosure 10 with their respective drive shafts 11a, 12a, 13a distributed offset by a respective 90 degree angle around the arm axle A. Expressed differently, the drive shafts 11a, 12a or 13a of two of the three actuators 11, 12, 13 can be situated at least approximately or exactly in the same plane E1, and the drive shaft of the third actuator can be situated in a common plane E2 with the drive shaft one of the two other actuators. The three drive shafts 11a, 12a, 13a can thus be situated in two orthogonal planes E1 and E2 that do not intersect with the arm axle A.

In the shown exemplary embodiment, both the first actuator 11 and the second and third actuator 12, 13 have a respective motor housing 11b, 12b, 13b that has an enclosure casing wall M in the shape of a circular arc at least in a sector S of said motor housing 11b, 12b, 13b that faces towards the arm axle A, in particular a sector of said motor housing 11b, 12b, 13b that faces towards the arm axle A and extending over at least a 90 degree angle.

In general the motor housing 11b, 12b, 13b can thus entirely have an enclosure casing wall M that has a cross section in the shape of a circular cylinder. In this varied embodiment, however, the actuators 11, 12, 13 can respectively have a motor housing 11b, 12b, 13b that has an enclosure casing wall that has a cross section in the shape of a circular arc only or at least in a sector S of said motor housing 11b, 12b, 13b that faces towards the arm axle A, and moreover that form [sic] vertices E as shown in FIG. 4, for example.

In a special embodiment as shown in FIG. 3, the actuators 11, 12, 13 can have an enclosure casing wall M that has a cross section in the shape of a circular arc in a sector S of the motor housing 11b, 12b, 13b facing toward the arm axle A and in a sector of the motor housing 11b, 12b, 13b facing away from the arm axle A.

Figure 4:
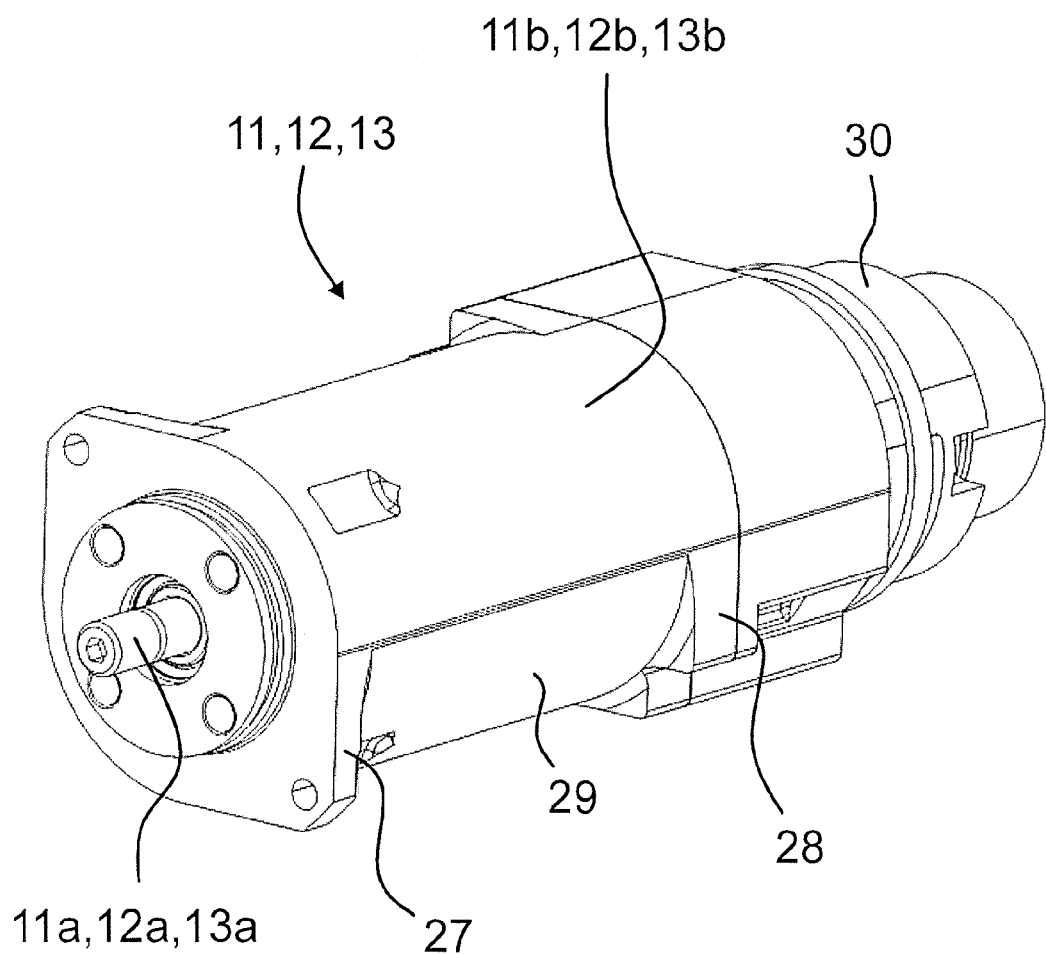
FIG. 4 is a perspective view of an example of an actuator from the arm extension according to FIG. 2.

As shown in FIG. 4 in an example of an actuator 11, 12, 13 in isolation with a rotary encoder 30, the first actuator 11, the second actuator 12 and/or the third actuator 13 can respectively have a motor housing 11b, 12b, 13b with an output-side flange 27, a flange 28 at the rotary encoder that is situated axially opposite the output-side flange 27, and a middle housing segment 29 that is arranged between the two flanges 27, 28, which middle housing segment 29 is formed in the shape of a tube with an annular wall thickness that is constant in cross section.

Although modifications and changes may be suggested by those skilled in the art, it is the intention of the inventor to embody within the patent warranted hereon all changes and modifications as reasonably and properly come within the scope of his contribution to the art.

I claim as my invention:

1. An industrial robot comprising:
a robot arm having a linkage and an arm extension mounted so as to be pivotable at said linkage;
said arm extension comprising an arm enclosure mounted so as to be pivotable at the linkage;
said arm extension comprising a primary hand enclosure mounted by a first actuator that has a first drive shaft at the arm enclosure, so as to rotate around an arm axle extending in a longitudinal dimension of the arm extension;
a quill drive mechanism that connects the arm enclosure with the primary hand enclosure so as to be rotatable, said quill drive mechanism comprising a hollow shaft through which at least one supply line of the primary hand enclosure, selected from the group consisting of electric lines, pneumatic lines and hydraulic lines, is routed, and extending at least essentially along the arm axle into the primary hand enclosure;
said arm extension comprising a first hand element that is adjustable around a first hand axle relative to the primary hand enclosure by a second actuator that has a second drive shaft, and a second hand element that is adjustable around a second-hand axle relative to the first hand element by a third actuator that has a third drive shaft; and
the first actuator and the second actuator and the third actuator being arranged in the primary hand enclosure with their respective drive shafts extending essentially parallel to and at a radial distance from the arm axle, and externally enclosing the at least one supply line in the primary hand enclosure.

2. The industrial robot according to claim 1, comprising a protective conduit having a casing wall arranged within the primary hand enclosure, said protective conduit enclosing the at least one supply line in the longitudinal direction, with the first actuator, the second actuator and the third actuator being arranged around the casing wall.

3. The industrial robot according to claim 1, wherein each of the first actuator, the second actuator and the third actuator are arranged in a distribution around the arm axle in the primary hand enclosure with their respective drive shafts offset by a 90 degree angle.

4. The industrial robot according to claim 1, wherein each of the first actuator, the second actuator and the third actuator has a motor housing that has an enclosure casing wall shaped as a circular arc, at least at a sector of each motor housing facing toward the arm axle.

5. The industrial robot according to claim 4, wherein said sector of each motor housing faces toward the arm axle and extends at least over a 90 degree angle.

6. The industrial robot according to claim 1, wherein each of the first actuator, the second actuator and the third actuator has a motor housing that has an enclosure wall of constant thickness, at least at a sector of each motor housing facing toward the arm axle.

7. The industrial robot according to claim 6, wherein said sector of each motor housing faces toward the arm axle and extends at least over a 90 degree angle.

8. The industrial robot according to claim 1, wherein each of the first actuator, the second actuator and the third actuator has a motor housing with an output-side flange, a rotary input-side flange situated axially opposite the output-side flange, and a middle housing segment between the two flanges that is forming a tube with an annular wall thickness that is constant in cross section.

9. The industrial robot according to claim 1, wherein at least one of the second actuator and the third actuator has an angular gear at an output-side flange thereof.

10. The industrial robot according to claim 9, wherein said angular gear deflects a turning moment of the respective actuator by a 90 degree angle.

11. The industrial robot according to claim 9, wherein said angular gear has an output side with a drive belt pulley that transfers the turning moment, via a drive belt running on the drive belt pulley, to a further drive belt pulley connected with the first-hand element or the second-hand element.

12. The industrial robot according to claim 1, wherein the first actuator has a driving pinion that meshes with an output cylindrical gear to form a cylindrical gearing stage, said output cylindrical gear being connected with the arm enclosure and/or with a drive-side input shaft of a quill drive mechanism connecting the arm enclosure with the primary hand enclosure so as to allow rotation.

* * * * *